June 9, 1964 N. L. HALL ETAL 3,136,518
INSTRUMENT SUPPORT FOR MACHINES
Filed Feb. 6, 1963 4 Sheets-Sheet 1

INVENTORS
Norman L. Hall
Francis A. Avery
BY
Parker & Poolman
ATTORNEYS.

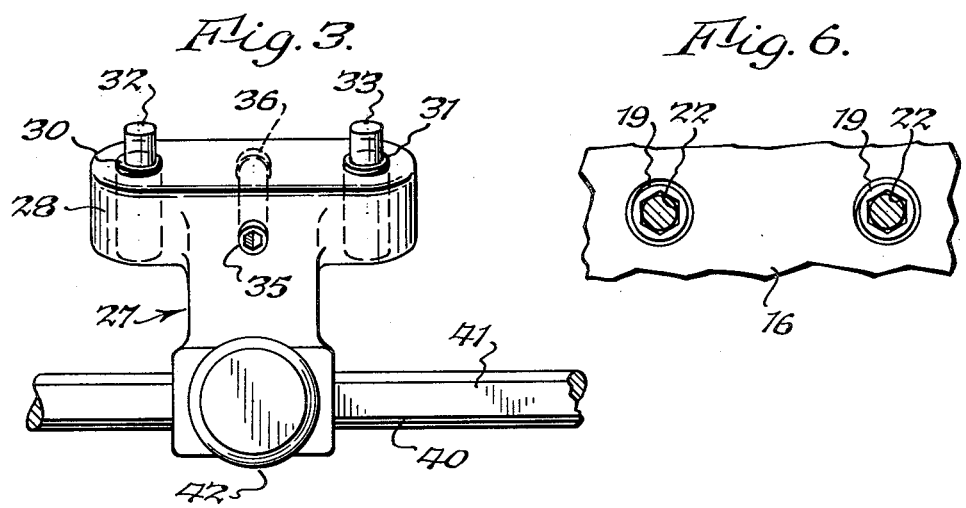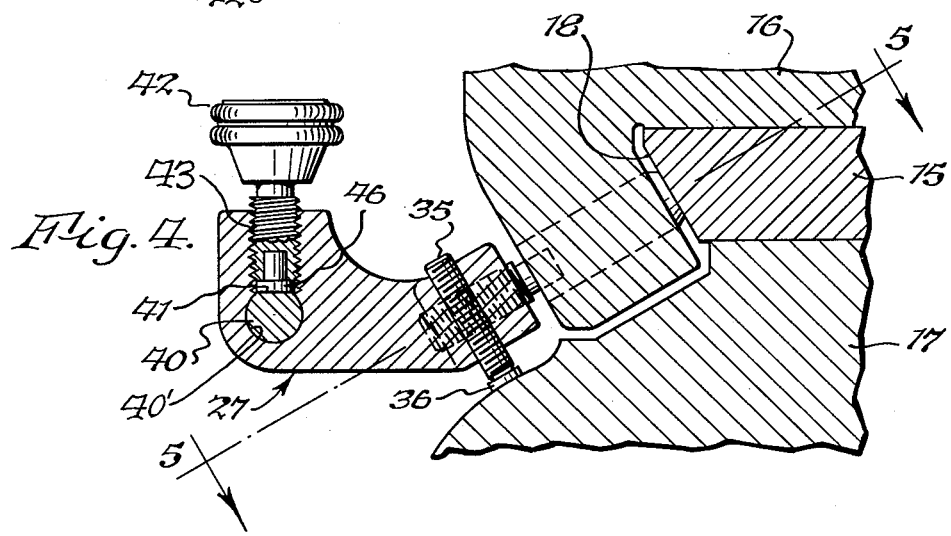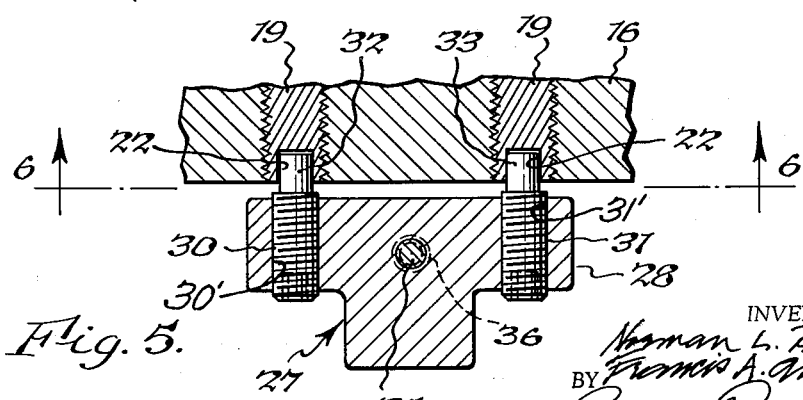

INVENTORS
Norman L. Hall
Francis A. Avery
BY
Parker & Buchmon
ATTORNEYS.

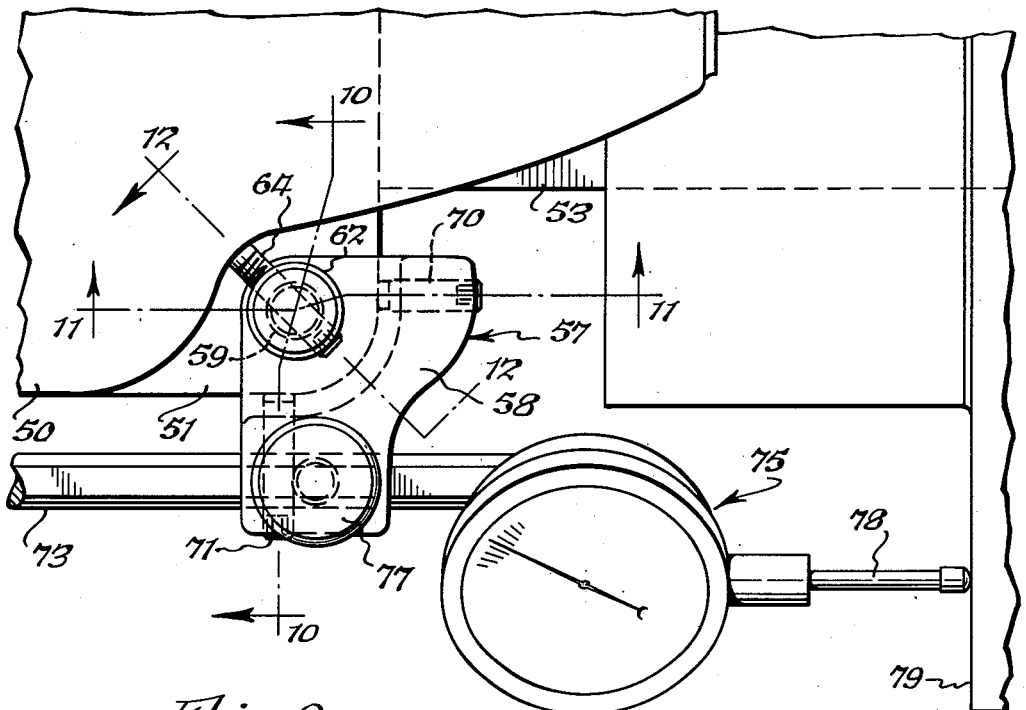
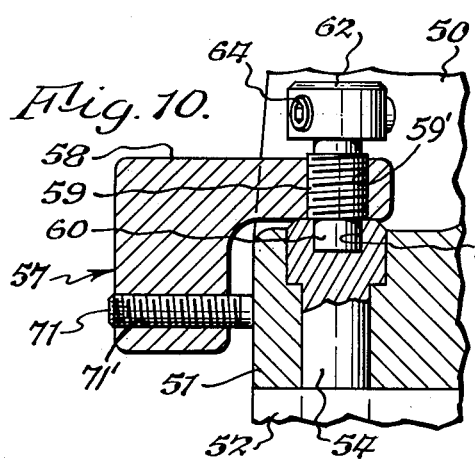
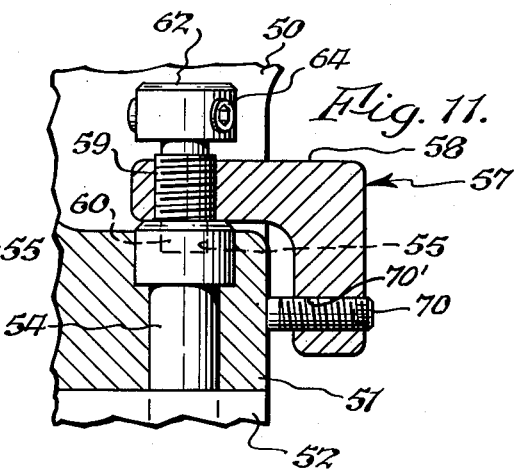
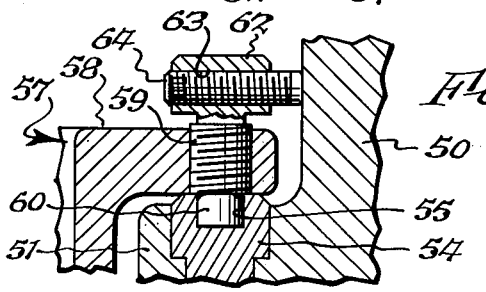

United States Patent Office 3,136,518
Patented June 9, 1964

3,136,518
INSTRUMENT SUPPORT FOR MACHINES
Norman L. Hall and Francis A. Avery, Elmira, N.Y.,
assignors to Hardinge Brothers, Inc., Elmira, N.Y.
Filed Feb. 6, 1963, Ser. No. 256,757
8 Claims. (Cl. 248—226)

This invention relates to improved means for mounting instruments on a machine in such a manner that the instruments can be mounted on a machine so that it will be readily accessible and will not interfere or restrict the use of the machine.

On a machine having a bed on which a carriage is movable to perform an operation, instruments for indicating longitudinal length of travel of the carriage along the bed have in the past been frequently mounted by means of a support secured to the bed. It has been found however that it is frequently desirable to utilize the portion of the bed on which the support is mounted in connection with certain work, thus interfering with the travel of the carriage on the bed. Instruments of this type have also been mounted on a machine pad on the headstock of the machine but this type of mounting requires machining of the headstock and possible removal of the same from the bed of the machine to make such machining possible.

One of the objects of this invention is to provide a mounting for an instrument which can be applied to a machine as heretofore made without disassembling any portion thereof and without the use of any special tools, drilling holes, etc.

Another object of this invention is to provide a support for an instrument which is mounted on the ends of screws which secure the headstock to the bed or other part of the machine.

It is also an object of this invention to provide an instrument support formed to cooperate with a holding screw and provided with clamping means for clamping the instrument support rigidly in fixed position on the machine.

In the drawings:

FIG. 3 is a top plan view of the supporting member detached from the machine.

FIG. 4 is a sectional elevation thereof on an enlarged scale on line 4—4, FIG. 1.

FIG. 5 is a fragmentary, sectional view thereof on line 5—5, FIG. 4.

FIG. 6 is a sectional view thereof on line 6—6, FIG. 5.

FIG. 9 is a fragmentary view of a headstock showing a plan view of the instrument support.

FIGS. 10–12 are sectional views thereof on lines 10—10, 11—11 and 12—12, FIG. 9.

Figure 1:
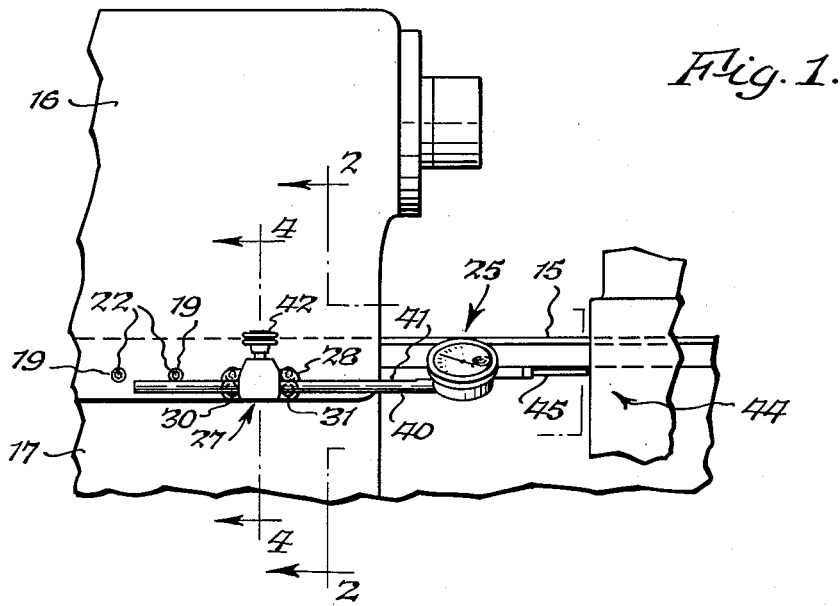
FIG. 1 is a fragmentary side elevation of a machine having an instrument mounted on the headstock thereof according to one embodiment of this invention.
Figure 2:
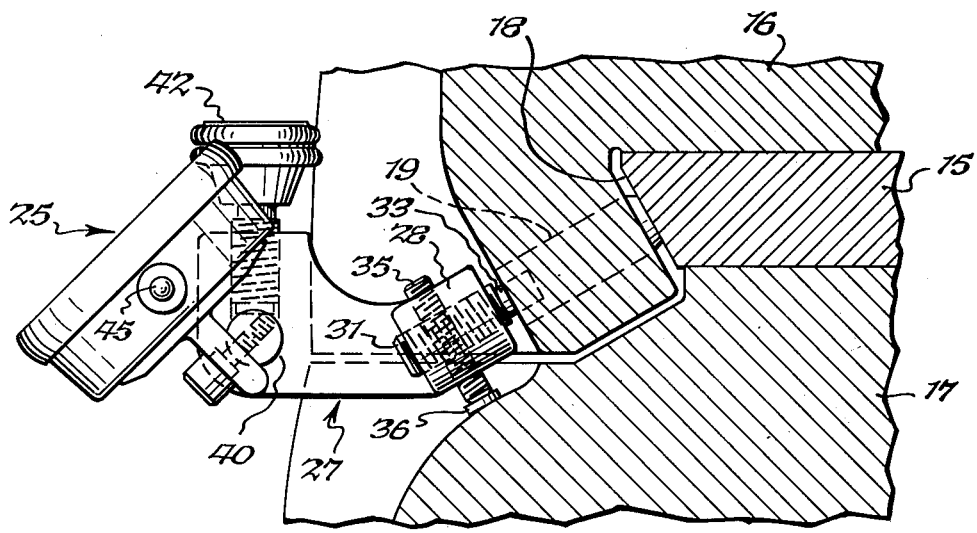
FIG. 2 is a sectional elevation thereof on an enlarged scale on line 2—2, FIG. 1.
Figure 7:
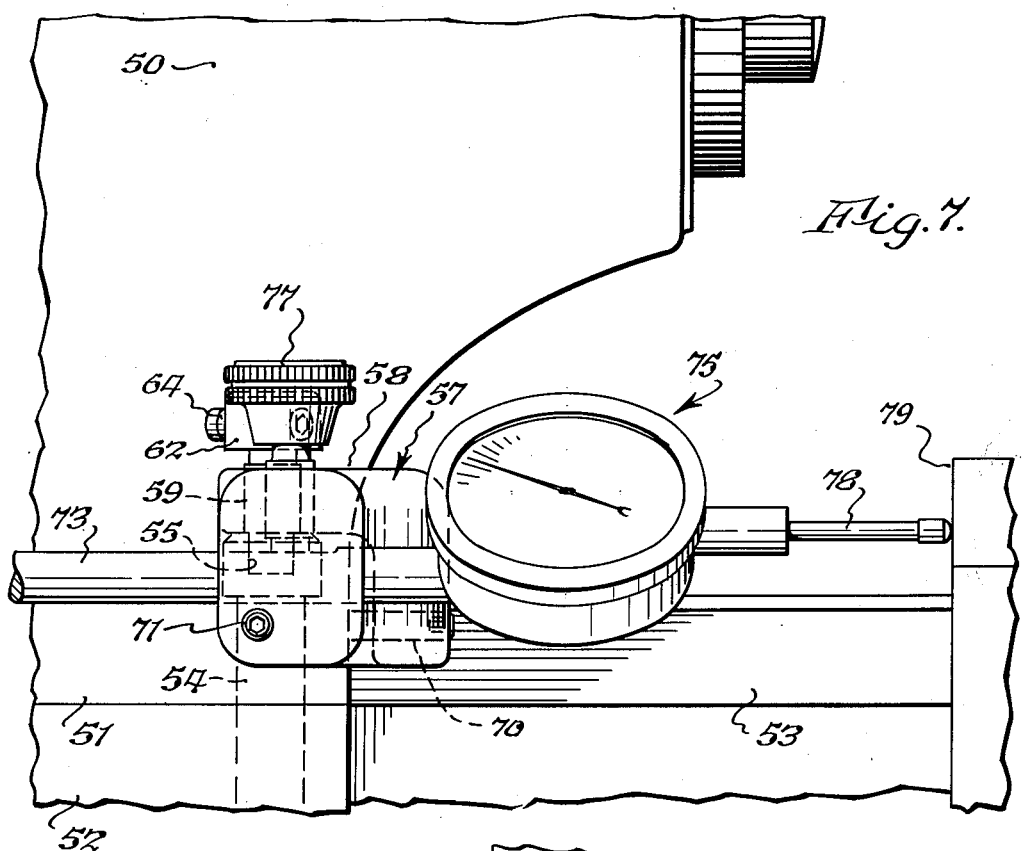
FIG. 7 is an elevation of an instrument supporting means of modified construction.
Figure 8:
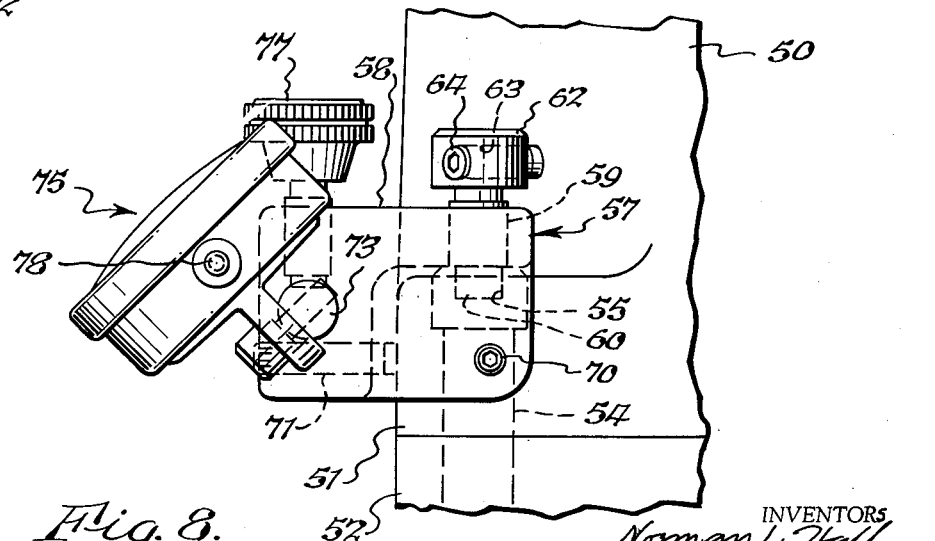
FIG. 8 is an end elevation thereof.

In the construction shown in FIGS. 1–6, we have illustrated our improvements as applied to a metal turning machine of the type commonly referred to as a chucking machine, including a bed 15 and a headstock 16 rigidly mounted on the lathe bed. In this construction the lathe bed as shown in FIG. 2 is in the form of a plate securely mounted on a body portion 17 of the machine and having downwardly and inwardly extending longitudinal edges 18. The headstock 16 is secured to the bed 15 by means of upwardly inclined clamping screws 19 extending through a downwardly projecting leg of the headstock of the machine and engaging bevelled edges 18 of the machine bed. The screws 19 preferably employed for this purpose are of the type having their outer ends provided with hexagonal sockets 22 formed to receive a hexagonal member whereby these screws can be tightly urged against the inclined face 18 of the machine bed. In the manufacture of machines of this type the screws 19 are carefully adjusted so that the rotary spindle in the headstock 16 of the machine has its axis parallel with the bed of the machine and consequently after these machines are sold and installed in a user's shop it is very desirable that these screws be left in the positions in which they are received from the manufacturer so as to ensure a high degree of accuracy in the position of the spindle with reference to the bed 15.

In accordance with this invention the instrument support which, for example, may be a longitudinal length indicator 25, is mounted in such a way as to leave the lathe bed free so that a part of the machine may be moved toward the headstock to the extreme end of the lathe bed 15 and also so that the support for the instrument may be applied to the machine without requiring any disassembling or machine work on the machine itself. Consequently an instrument support is provided which cooperates with one or more of the sockets 22 in the ends of the anchoring screws, two of these screws being used in the construction in FIGS. 1–6.

The instrument support has a body member 27 having an enlargement 28 provided with projecting parts entering the sockets in the mounting screws. Such projecting parts may be conveniently formed by a pair of screws 30 and 31 engaging threaded holes 30' and 31' in the head 28 and having projecting ends 32 and 33 of rounded or cylindrical form spaced to enter into the sockets of two of the anchoring screws 19. The rounded ends of one or both of the screws 30 and 31 are eccentric with the axis of these screws. Consequently, when the cylindrical portions of the two screws are fitted into the sockets of the anchoring screws 19, and these screws are turned the ends 32 and 33 of the screws 30 and 31 will bind in their sockets 22, and thus lock the body member of the instrument support securely on the headstock of the machine. Additional securing of the body member of the instrument support is provided by means of a jam member or screw 35 extending through a threaded hole in the body member and pressing against the part 17 of the machine. Preferably a pad 36 of soft metal or other material is interposed between the end of the jam screw and the machine part 17. When this screw 35 is tightened then together with the eccentric ends of the screws 30 and 31, the body member will be very securely held against any movement relatively to the machine.

The instrument 25 may be adjustably mounted on the body member of the support in any suitable manner and in the construction illustrated by way of example, the body part 27 is provided with a hole 40' through which a support rod 40 extends. This rod preferably has a flat face 41 which cooperates with a locking screw 42 which cooperates with a threaded hole 43 and which terminates at the hole through which the rod 40 extends. Consequently it will be seen that the instrument 25 may be securely held relatively to the machine. If the instrument is of the type which is intended to indicate longitudinal travel of a part of the machine, such for example as a carriage 44, the stem 45 of the instrument projects outwardly for engagement with the movable machine part. The instrument is of course adjustable toward and from the movable machine part 44 by releasing the locking screw 42 until the instrument is located in correct position for indicating the movement to be measured, whereupon the locking screw is tightened. 46 is a contact part of softer metal or other material interposed between the locking screw and the rod 40. The eccentric ends on the screws 30 and 31 make it possible to adjust the rod 40 to extend parallel to the path of movement of the carriage 44.

In FIGS. 7–12 inclusive we have shown a mounting for an instrument or indicator in connection with a different type of machine such, for example, as a tool room lathe in which the headstock 50 of the lathe has laterally extending horizontal foot portions 51 through which mounting screws pass for securing the headstock 50 to a fixed frame member 52 of the machine on which a bed plate 53 is also mounted. In this construction mounting screws are provided which pass through holes in the foot portions 51 of the head and have a threaded engagement in holes formed in the body portion 52 of the machine. In this case only one of the mounting screws is employed to mount the instrument support on the machine, namely, the mounting screw 54, which has a hexagonal socket 55 formed in the upper end thereof.

The supporting member 57 for the instrument is provided with a flat, upper face 58 formed to extend over the mounting screw 54 and this part of the support has a projection formed to extend into the socket of the mounting screw 54. This projection is preferably in the form of a locating screw 59 extending through a threaded hole 59' in the support 57. This screw has a cylindrical end 60 which is formed to enter the hexagonal socket of the mounting screw 54.

The locating screw 59 has a head 62 with a transversely extending threaded hole 63 therein through which a jam screw 64 extends. The head 62 is turned so that the screw 64 engages an upright wall of the head 50 and consequently by tightening the jam screw 64, the cylindrical end portion thereof will be clamped into fixed relation to the hexagonal socket of the mounting screw 54, thus providing a wedging action for locking the support on the headstock.

In order to further secure the instrument support very rigidly in fixed relation to the headstock 50, we provide the body portion with additional jam screws 70 and 71 which extend through threaded holes 70' and 71' respectively in parts of the support 57 with their axes approximately at right angles to each other and formed to engage the foot portion 51 of the headstock 50. Obviously when these two jam screws are tightened they will exert additional pressure against the cylindrical projection 60 of the positioning screw 59 so that the support 57 is very rigidly held in fixed relation to the head of the machine.

The support, like the one shown in FIGS. 1 to 6, is provided with a hole therein extending substantially parallel to the bed 53 to receive a support rod 73 on which the instrument 75 may be mounted in any usual manner. The support rod is adjustable lengthwise of the support 57 through the hole therein and is secured in fixed relation to the support by means of a locking screw 77. It will thus be seen that the instrument 75 will be secured in fixed position relatively to the head 50 of the machine and the support for this instrument can consequently be attached to any machine having an upright head mounting screw, thus requiring no change or dismounting of any part of the machine.

By arranging the two jam screws with their axes extending substantially perpendicular to the axis of the screw 59, the support can be so positioned that the support rod 73 and the stem 78 of the instrument extend approximately parallel to the path of movement of the carriage of the machine.

It will be understood that various changes in the details, materials and arrangements of parts which have been herein described and illustrated in order to explain the nature of the invention may be made by those skilled in the art within the principle and scope of the invention as expressed in the appended claims.

We claim:
1. An instrument support for a machine having a bed on which a carriage is movable and a head supporting a rotary spindle, said head being mounted on said machine by means of mounting screws having sockets in the outer ends thereof,
   said instrument support comprising a body member having a projection formed to enter a socket of one of said mounting screws,
   a rod mounted on said body member and adapted to extend into the path of movement of said carriage and to support said instrument,
   and jam members at approximately right angles to each other and said projection interposed between said body member and said head and adapted to hold said body member in adjusted relation to said head.
2. An instrument support according to claim 1 in which each of said jam members is in the form of a screw having a threaded engagement with said body member and having its end adapted to engage said head to force said body member from said head.
3. An instrument support according to claim 1 in which said projection of said body member is in the form of a screw having its end of a form to fit into a socket of a mounting screw.
4. An instrument support for use on a machine having a head secured to the machine by means of mounting screws each of which has a socket in the outer end thereof,
   said instrument support having a body portion,
   a screw having a threaded engagement with said body portion and having its end of substantially cylindrical form to enter the socket of a mounting screw,
   and jam screws at approximately right angles to each other and said end and having a threaded engagement with said body portion and adapted to press against said head to form a rigid mounting of said support on said head, and a rod supported on said body portion and adapted to support an instrument.
5. An instrument support for a machine having a bed on which a carriage is movable and a head supporting a rotary spindle, said head being mounted on said machine by means of mounting screws having sockets in the outer ends thereof,
   said instrument support comprising a body member having a projection formed to enter a socket of one of said mounting screws,
   a screw having a threaded engagement with said instrument support and having a rounded end portion eccentric with the axis of said screw and formed to enter a socket of another mounting screw,
   whereby the turning of said screw with the eccentric end portion urges said support in a direction away from said first mentioned mounting screw and adapted to lock said body portion into fixed relation to said head,
   a jam screw at approximately right angles to said projection also having a threaded engagement with said body portion and having an end adapted for engagement with said head to prevent movement of said support relatively to said head, and a rod supported on said body portion and adapted to support an instrument.
6. An instrument support for use on a machine having a head secured to the machine by means of mounting screws each of which has a socket in the outer end thereof,
   said instrument support having a body portion,
   a pair of screws having threaded engagement with said body portion and each having its end of substantially cylindrical form to enter the sockets of two mounting screws,
   the cylindrical end of one of said last mentioned screws being arranged eccentrically with reference to the axis of the screw, whereby turning of said last mentioned screw is adapted to bind both of said screws on said mounting screws, jam means interposed between said body portion and said head for supplementing the rigid mounting of said support on said head, and a rod adjustably mounted on said support on which an instrument may be secured.

7. An instrument according to claim 6 in which the cylindrical ends of both of said pairs of screws are eccentric for binding said screws on said mounting screws and for positioning said body portion in correct angular relation to said machine.

8. An instrument support for use on a machine having a head secured to the machine by means of mounting screws extending substantially vertically and each of which has a socket on the outer end thereof, said instrument support having a body portion provided with a projection formed to enter into the socket of one of said mounting screws, a pair of jam screws having threaded engagement with said support and extending in different angular relations relatively to each other and to the mounting screw and having their outer ends adapted to engage said head for exerting pressure on said head to lock said support on said head and to swing said body portion about said mounting screw to position said instrument in correct relation to said machine, and a rod adjustably mounted on said support on which an instrument may be secured.

References Cited in the file of this patent

UNITED STATES PATENTS

| | | |
|---|---|---|
| 2,124,006 | Parker | July 19, 1938 |
| 2,219,370 | Pierce | Oct. 29, 1940 |
| 2,971,738 | Way | Feb. 14, 1961 |

FOREIGN PATENTS

| | | |
|---|---|---|
| 835,452 | Great Britain | May 18, 1960 |